US010958334B1

(12) United States Patent
Sullivan (10) Patent No.: US 10,958,334 B1
(45) Date of Patent: Mar. 23, 2021

(54) ROUTING FOR NON-GEOSTATIONARY ORBIT (NGSO) SATELLITE SYSTEMS

(71) Applicant: The Boeing Company, Chicago, IL (US)

(72) Inventor: Scott Charles Sullivan, South Pasadena, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/732,718

(22) Filed: Jan. 2, 2020

(51) Int. Cl.
*H04Q 3/58* (2006.01)
*H04B 7/185* (2006.01)
*H04W 40/12* (2009.01)
*H04W 28/06* (2009.01)
*H04W 40/24* (2009.01)
*H04W 72/04* (2009.01)

(52) U.S. Cl.
CPC .......... *H04B 7/1851* (2013.01); *H04W 28/06* (2013.01); *H04W 40/12* (2013.01); *H04W 40/246* (2013.01); *H04W 40/248* (2013.01); *H04W 72/044* (2013.01)

(58) Field of Classification Search
CPC .............. H04B 7/18521; H04B 7/1851; H04B 7/18584; H04B 17/40; H04W 84/06; H04W 36/32; H04W 40/20; H04W 36/0005; H04W 36/00837; H04W 36/12; H04L 2001/0097; H04L 45/22
See application file for complete search history.

(56) References Cited

U.S. PATENT DOCUMENTS

| 6,032,041 A * | 2/2000 | Wainfan ................. H04B 7/195 455/427 |
| 2018/0316428 A1* | 11/2018 | Barritt ................. H04B 10/1129 |
| 2019/0306778 A1 | 10/2019 | Scott |

FOREIGN PATENT DOCUMENTS

EP 0961420 A1 12/1999

OTHER PUBLICATIONS

Chao Chen; Advanced Routing Protocols for Satellite and Space Networks; Georgia Institute of Technology; May 2005.
Zijing Cheng et al; Snapshot Integration Routing for High-Resolution Satellite Sensor Networks Based on Delay-Tolerent Network; 2015 IEEE Internation Conference on Computer and Information Technology.

* cited by examiner

*Primary Examiner* — Tu X Nguyen
(74) *Attorney, Agent, or Firm* — Duft & Bornsen, PC (57) ABSTRACT

A Non-Geostationary Satellite Orbit (NGSO) satellite system is described that implements one or more user route tables and a plurality of pre-calculated backbone route tables at its satellites. The user route tables track user connectivity to the satellites, and each of the backbone route tables defines a snapshot of a time-varying backbone topology seen by a particular satellite. During operation, a satellite selects different backbone route tables as the topology changes over time, and receives updates to the user route tables when connectivity changes occur between the users and the satellites. The decoupling of the user route tables from the backbone route tables at the satellite reduces the computational burden on the NGSO system, as the backbone route tables are calculated in advance and the NGSO system is subsequently tasked with a computationally lower burden of performing real-time updates to the user route tables.

25 Claims, 6 Drawing Sheets

| TABLE NUMBER | MATCH CONDITION | ACTION |
|---|---|---|
| 0 | IP PREFIX FOR USER 114-1 | WRITE NODE ID OF SATELLITE 102-4, GOTO TABLE 2 |
| | IP PREFIX FOR USER 114-3 | WRITE NODE ID OF SATELLITE 102-3, GOTO TABLE 2 |
| | NO MATCH | GOTO TABLE 1 |
| 1 | IP PREFIX FOR USER 114-2 | SEND DATA PACKET OVER PORT 403 |
| | NO MATCH | DROP |
| 2 | ALL | GOTO TABLE 3 |
| 3 | NODE ID OF SATELLITE 102-1 | SEND PACKET OVER PORT 401 |
| | NODE ID OF SATELLITE 102-3 | SEND PACKET OVER PORT 405 |
| | NODE ID OF SATELLITE 102-4 | SEND PACKET OVER PORT 402 |
| | NODE ID OF SATELLITE 102-5 | SEND PACKET OVER PORT 402 |
| | NODE ID OF SATELLITE 102-6 | SEND PACKET OVER PORT 404 |
| 4 | NODE ID OF SATELLITE 102-1 | SEND PACKET OVER PORT 402 |
| | NODE ID OF SATELLITE 102-3 | SEND PACKET OVER PORT 405 |
| | NODE ID OF SATELLITE 102-4 | SEND PACKET OVER PORT 401 |
| | NODE ID OF SATELLITE 102-5 | SEND PACKET OVER PORT 402 |
| | NODE ID OF SATELLITE 102-6 | SEND PACKET OVER PORT 405 |
| N | NODE ID OF SATELLITE 102-1 | SEND PACKET OVER PORT 405 |
| | NODE ID OF SATELLITE 102-3 | SEND PACKET OVER PORT 405 |
| | NODE ID OF SATELLITE 102-4 | SEND PACKET OVER PORT 401 |
| | NODE ID OF SATELLITE 102-5 | SEND PACKET OVER PORT 402 |
| | NODE ID OF SATELLITE 102-6 | SEND PACKET OVER PORT 402 |

FIG. 6

ROUTING FOR NON-GEOSTATIONARY ORBIT (NGSO) SATELLITE SYSTEMS

FIELD

This disclosure relates to the field of routing in satellite systems. In particular, the present disclosure relates to routing data traffic in NGSO satellite systems.

BACKGROUND

NGSO systems utilize constellations of satellites in Low Earth Orbit (LEO) and/or Medium Earth Orbit (MEO) that sweep across the surface of the Earth as they orbit the Earth. This is in contrast to satellites in Geostationary Earth Orbit (GEO), which are stationary with respect to the surface of the Earth as they orbit the Earth.

Due to their relative motion to the surface of the Earth, NGSO satellite systems incur a larger number of ground antenna handovers than GEO satellite systems. Further, unlike handovers in a GEO satellite system that occur due to mobile terminal mobility (e.g., beam handover), NGSO satellite systems are tasked with supporting multiple types of handovers, including intra-orbit handovers (due to the motion of satellites with respect to each other in the same orbital planes), inter-orbit handovers (due to the motion of satellites with respect to each other in different orbital planes), link handovers (due to link outages, which may be due to node and/or link failures), and beam handovers (due to satellite motion, the rotation of the Earth, and/or mobile terminal mobility).

Current solutions for routing in NGSO satellite systems implement link-state routing using Internet Protocol (IP) routers onboard the satellites. Using this approach, a management system constantly calculates and updates the routing information in real time for the entire satellite network when a handover event occurs. As NGSO satellite systems incur a higher number of handovers due to their non-stationary orbits with respect to the surface of the Earth and also due to their relative motion with respect to each other, this type of solution does not scale well to NGSO satellite systems that utilize a large number of satellites. Further, this type of solution is subject to failure when the management system is no longer able, even temporarily, to perform the real-time calculations that the NGSO satellite system relies upon for routing information updates.

SUMMARY

A NGSO satellite system is described that implements one or more user route tables and a plurality of pre-calculated backbone route tables at its satellites. The user route tables track user connectivity to the satellites in the NGSO system, and each of the backbone route tables defines a snapshot of a time-varying backbone topology seen by a particular satellite. During operation, a satellite selects different backbone route tables as the topology changes over time, and performs updates to the user route tables when user and satellite connectivity changes occur. The decoupling of the user route tables from the backbone route tables at the satellite reduces the computational burden on the NGSO system, as the backbone route tables are calculated in advance and the NGSO system is subsequently tasked with a computationally lower burden of performing real-time updates to the user route tables. Further, the decoupling of the user route tables from the backbone route tables reduces the amount of real-time information that is exchanged between the satellites and ground assets in the NGSO satellite system.

One embodiment comprises a method operable by a satellite of a NGSO system. The method comprises receiving a plurality of backbone route tables from a ground controller, where each of the backbone route tables defines a snapshot of a time-varying backbone topology of the NGSO system, receiving one or more user route tables from the ground controller, where the user route tables identify connectivity of users to satellites in the NGSO system, and receiving a data packet for routing in the NGSO system. The method further comprises determining, based on the user route tables, if the data packet is destined for a first user directly connected to another satellite in the NGSO system. Responsive to determining that the data packet is destined for the first user, the method further comprises identifying the other satellite based on the user route tables, identifying an active backbone route table from the plurality of backbone route tables, and forwarding the data packet to the other satellite based on the active backbone route table. The method further comprises determining, based on the user route tables, if the data packet is destined for a second user directly connected to the satellite, and responsive to determining that the data packet is destined for the second user, transmitting the data packet to the second user over a user-link maintained by the satellite.

Another embodiment comprises a non-transitory computer readable medium embodying programmed instructions which, when executed by one or more processors of a satellite of a Non-Geostationary Satellite Orbit (NGSO) system, directs the satellite to receive a plurality of backbone route tables from a ground controller, where each of the backbone route tables defines a snapshot of a time-varying backbone topology of the NGSO system, receive one or more user route tables from the ground controller, where the user route tables identify connectivity of users to satellites in the NGSO system, and receive a data packet for routing in the NGSO system. The instructions further direct the one or more processors to determine, based on the user route tables, if the data packet is destined for a first user directly connected to another satellite in the NGSO system. Responsive to a determination that the data packet is destined for the first user, the instructions further direct the one or more processors to identify the other satellite based on the user route tables, identify an active backbone route table from the plurality of backbone route tables, and forward the data packet to the other satellite based on the active backbone route table. The instructions further direct the one or more processors to determine, based on the user route tables, if the data packet is destined for a second user directly connected to the satellite. Responsive to a determination that the data packet is destined for the second user, the instructions further direct the one or more processors to transmit the data packet to the second user over a user-link maintained by the satellite.

Another embodiment comprises an NGSO system that includes a satellite. The satellite includes a memory storing a plurality of backbone route tables received from a ground controller, where each of the backbone route tables defines a snapshot of a time-varying backbone topology of the NGSO system and one or more user route tables received from the ground controller, where the user route tables identify connectivity of users to satellites in the NGSO system. The satellite includes a communication system that implements at least one of user-links with users of the NGSO system, intra-orbit links with other satellites in the NGSO system that share a common orbital plane with the satellite, and inter-orbit links with the other satellites in the NGSO system that are in different orbital planes to the satellite. The satellite further includes at least one processor that receives a data packet for routing in the NGSO system, and determines, based on the user route tables, if the data packet is destined for a first user directly connected to another satellite in the NGSO system. The at least one processor, responsive to determining that the data packet is destined for the first user, identifies the other satellite based on the user route tables, identifies an active backbone route table from the plurality of backbone route tables, and forwards the data packet to the other satellite over an inter-orbit link or an intra-orbit link based on the active backbone route table. The at least one processor determines, based on the user route tables, if the data packet is destined for a second user directly connected to the satellite, and responsive to determining that the data packet is destined for the second user, transmits the data packet to the second user over a user-link maintained by the satellite The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
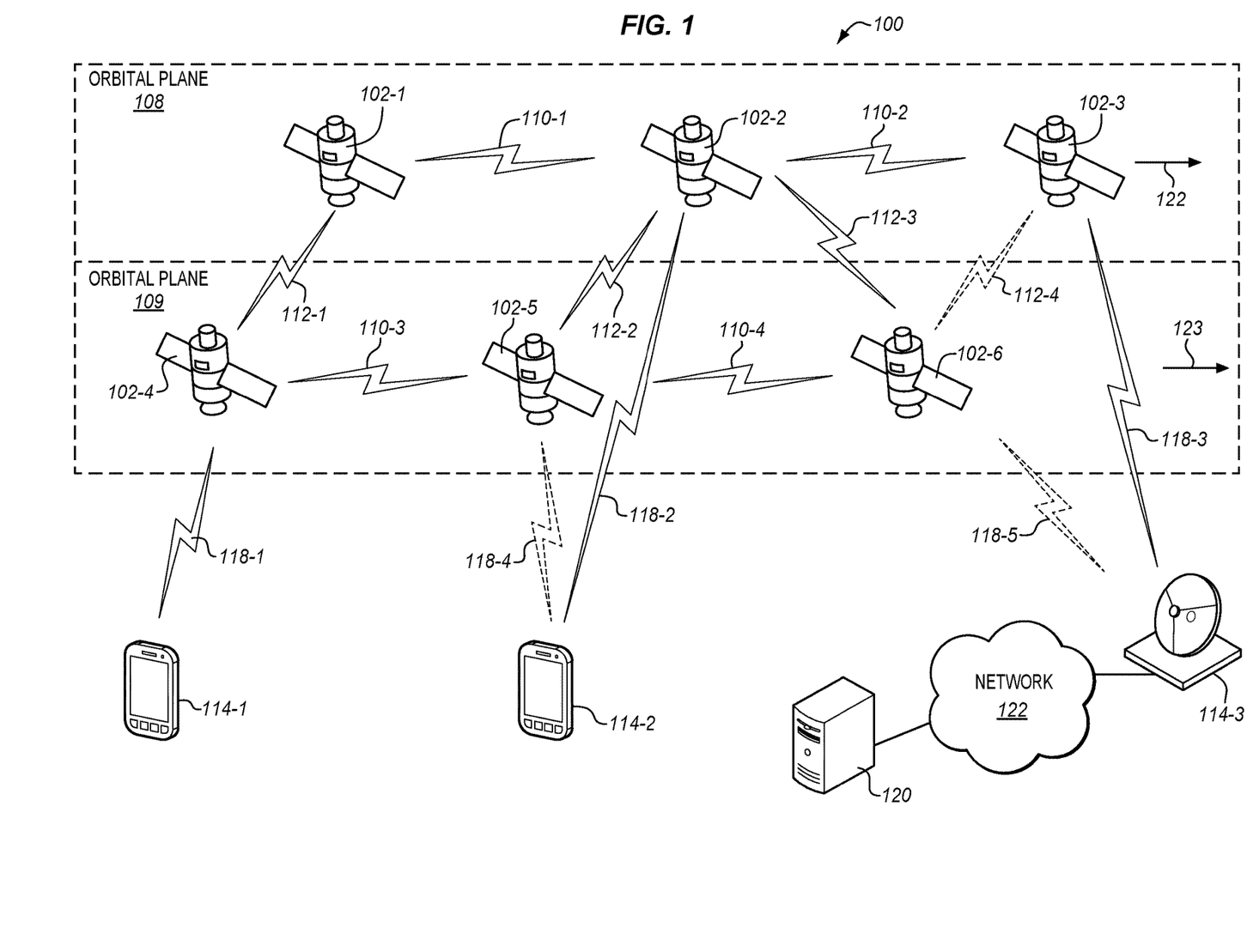
FIG. 1 depicts a NGSO satellite system topology in an illustrative embodiment.

As discussed previously, existing routing solutions for NGSO satellite systems rely heavily on real-time calculations and updates to on-board satellite Internet Protocol (IP) routers during handover events, which occur more frequently in NGSO satellite systems as compared to GEO satellite systems. FIG. 1 depicts a NGSO satellite system topology 100 in an illustrative embodiment. In this embodiment, topology 100 includes a plurality of NGSO satellites 102 disposed within orbital planes 108-109. Orbital planes 102 108-109 comprise MEO orbital planes, LEO orbital planes, or combinations of MEO and LEO orbital planes in various embodiments. LEO satellites are typically found a circular orbit around the Earth between about 160 kilometers (km) to about 2,000 km above the Earth's surface, with an orbital period of about 90 minutes. MEO satellites are typically found in a circular orbit around the Earth between 2,000 km and less than GEO levels (e.g., 35,786 km), with orbital periods that vary from about 2 hours to nearly 24 hours.

While topology 100 only depicts satellites 102 in LEO and MEO orbital planes, topology 100 in other embodiments include satellites in LEO and/or MEO in conjunction with other satellites (not shown) in GEO orbital planes. In topology 100, satellite 102-1, satellite 102-2, and satellite 102-3 lie in orbital plane 108, and satellite 102-4, satellite 102-5, and satellite 102-6 lie in orbital plane 109.

In topology 100, intra-orbital links 110 allow satellites 102 that lie in the same orbital planes 107-108 to communicate with each other. Generally, intra-orbital links 110 are fixed over time, as satellites 102 that lie in the same orbital planes 107-108 typically do not change position with respect to each other. Further in this embodiment, inter-orbital links 112 allow satellites 102 that lie in different orbital planes 107-108 to communicate with each other. Inter-orbital links 112 change over time as satellites 102 that lie in different orbital planes 107-108 move with respect to each other. For example, if orbital plane 109 is closer to the surface of the Earth than orbital plane 108, then satellites 102 in orbital plane 109 may move in the direction of arrow 123 with respect to satellites 102 in orbital plane 108 (e.g., satellites 102 in orbital plane 109 sweep across the surface of the Earth at a faster rate than satellites 102 in orbital plane 108). As this movement occurs, a handoff may occur for satellite 102-6 as satellite 102-6 changes its communication from satellite 102-2 to satellite 102-3. When a handoff occurs for satellite 102-6, an inter-orbital link 112-4 is created between satellite 102-6 and satellite 102-3, and an inter-orbital link 112-3 between satellite 102-6 and satellite 102-2 may be terminated.

Further in this embodiment, satellites 102 communicate with users 114 via user-links 118. In this embodiment, user 114-1 and user 114-2 are depicted as mobile terminals (e.g., a mobile satellite phone) and user 114-3 is depicted as a ground station (e.g., a fixed placement installation). However, the number and types of users 114 is different in other embodiments.

User-links 118 change over time as users 114 that are mobile (e.g., user 114-1 and user 114-2) move across the surface of the Earth, and/or as satellites 102 move over time with respect users 114. For example, if satellites 102 in orbital planes 108-109 move in the direction of arrows 122-123 with respect to the surface of the Earth, user 114-3 may be handed off from satellite 102-3 to satellite 102-6. In this example, a user-link 118-5 is created between user 114-3 and satellite 102-6, and a user-link 118-3 between user 114-3 and satellite 102-3 may be terminated. In another example, user 114-2 may be handed off from satellite 102-2 to satellite 102-5. In this example, a user-link 118-4 is created between user 114-2 and satellite 102-5, and a user-link 118-2 between user 114-2 and satellite 102-2 may be terminated.

In prior NGSO architectures, either a time-varying change in the NGSO topology or a time-varying change in the connectivity of users to the NGSO satellites generated real-time updates to the IP routing tables used by the NGSO satellites, with the topology changes requiring a ground asset to both calculate a new backbone routing strategy based on the orbital mechanics of the NGSO satellites and to upload the backbone routing changes to the NGSO satellites. This type of real-time update generates significant computational overhead in an NGSO satellite system and real-time data updates between ground assets in the NGSO satellite system and the satellites, and also does not scale well when the number of NGSO satellites increases due to the increasing complexity of a time-varying topology. Further, when partial system outages occur and the real-time updates are not being distributed to the NGSO satellites, then partial or complete failures may occur in the system as NGSO satellites move out of position with respect to each other and their inter-orbit and/or intra-orbit communication links are lost.

In the embodiments described herein, time-varying changes to the backbone route tables in topology 100 and the time-varying changes to the user route tables in topology 100 are decoupled from each other using separate routing tables onboard satellites 102. Further, the time-varying changes to the backbone route tables in topology 100 are pre-calculated by a ground controller 120 of topology 100, are uploaded to satellites 102, and are selected at different points in time by satellites 102. As topology 100 changes over time, satellites 102 utilize different backbone route tables (e.g., as instructed by ground controller 120). As the user route tables in topology 100 change over time (e.g., as users 114 are handed off from one satellite 102 to another satellite 102), ground controller 120 updates the user route tables of satellites 102 independently from the backbone route tables, which reduces the real-time information that is exchanged between satellites 102 and ground controller 120. In particular, a technical benefit is achieved that allows ground controller 120 to manage a larger number of NGSO satellites over prior NGSO systems because the real-time aspect of calculating backbone connectivity changes for topology 100 is reduced or eliminated. Further, a temporary loss in communicating between satellites 102 and ground controller 120 does not immediately generate a failure in topology 100 as in prior NGSO systems, because satellites 102 continue to adapt to the backbone connectivity changes over time using their pre-calculated backbone route tables that are stored locally at each satellite 102.

In some embodiments, ground controller 120 comprises a Software-Defined Networking (SDN) architecture. In these embodiments, topology and traffic engineering intelligence and algorithms are instantiated as SDN applications executing on ground controller 120. Ground controller 120 manages satellites 102 using a-priori knowledge of movement of satellites 102 in orbital planes 107-108. In some embodiments, an SDN control plane is used to configure the routing tables for satellites 102. In these embodiments, ground controller 120 manages user 114 connectivity routes and topology 100 connectivity routes, in addition to inter-orbit links 112. Ground controller 120 is aware, a-priori when inter-orbit satellites 102 have overlapping fields of view with each other (e.g., when a field of view of satellite 102-2 overlaps with satellite 102-6). Ground controller 120 also optimizes backbone routes for topology 100, making decisions as to which inter-orbit links 112 to create and break (e.g., by creating inter-orbit link 112-4, and breaking inter-orbit link 112-3 as satellite 102-6 transitions out of the field of view of satellite 102-2 and transitions into the field of view of satellite 102-3).

In some embodiments, ground controller 120 manages handover requests between users 114 and satellites 102. In one such embodiment, ground controller 120 manages handover requests for users 114 using a mobility management SDN application executing on ground controller 120, updating the user routing tables onboard satellites 102 in real-time in response to user-link 118 handovers (e.g., the user route tables are based on real-time connectivity changes between users 114 and satellites 102). In other embodiments, ground controller 120 utilizes a-priori knowledge regarding predicted handoff events between users 114 and satellites 102 to pre-calculate and upload the user route tables to satellites 102 (e.g., the user route tables are based on the predicted connectivity changes between users 114 and satellites 102). Using pre-calculated user route tables, satellites 102 may operate autonomously with respect to handovers between users 114 and satellites 102 when a temporary loss of communication occurs between satellites 102 and ground controller 120.

In this embodiment, satellites 102 comprise any combination of hardware and/or software that provides in-orbit communication capabilities to users 114 and other satellites 102, including providing user-link 118 communication capabilities, intra-orbit link 110 communication capabilities, and inter-orbit link 112 communication capabilities.

Figure 2A:
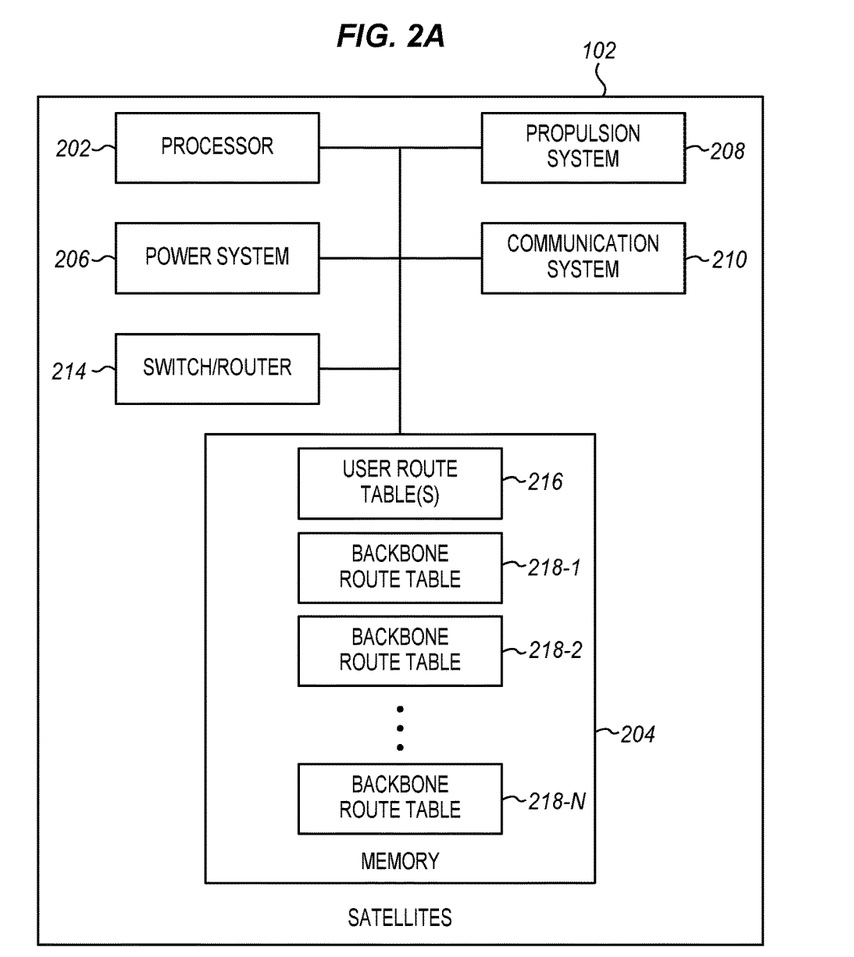
FIG. 2A is a block diagram of a satellite of the NGSO satellite system of FIG. 1 in an illustrative embodiment.

FIG. 2A is a block diagram of satellites 102 in an illustrative embodiment. In this embodiment, satellites 102 include, without limitation, one or more processors 202 that execute software instructions, a memory 204, a power system 206, a propulsion system 208, a communication system 210, and one or more switches/routers 214. Processor 202 (and any other processors described herein) includes any hardware device that is able to perform functions described for satellites 102. Processor 202 (and any other processors described herein) may include one or more Central Processing Units (CPU), microprocessors, Digital Signal Processors (DSPs), Application-specific Integrated Circuits (ASICs), etc. Some examples of processors include INTEL® CORE™ processors, Advanced Reduced Instruction Set Computing (RISC) Machines (ARM®) processors, etc.

Memory 204 (and any other memory devices described herein) includes any hardware device that is able to store data. Memory 204 (and any other memory devices described herein) may include one or more volatile or non-volatile Dynamic Random-Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

Power system 206 comprises any component, system, or device that stores and generates power for satellites 102. Some examples of power system 206 includes batteries, solar panels, fuel cells, etc. Propulsion system 208 comprises any component, system, or device that provides in-orbit maneuvering capabilities to satellites 102. Propulsion system 208 may comprise onboard fuel, rocket motors, ion thrusters, etc. Communication system 210 comprise any component, system, or device that enables satellites 102 to communicate with each other via intra-orbit links 110 and inter-orbit links 112, and also with users 114 via user-links 118. Communication system 210 may comprise radio communication systems, optical communication systems, or combinations of radio and optical communication systems.

Switch/router 214 comprises any component, system, or device that provides packet routing capabilities to satellites 102. Such packet routing capabilities include routing data packet received from satellites 102 to communication system 210 for data transmission over intra-orbit links 110, inter-orbit links 112, and user-links 118.

In this embodiment, memory 204 stores one or more user route tables 216 and a plurality of backbone route tables 218. Generally, user route tables 216 and backbone route tables 218 are different for each satellite 102 in topology 100. For each satellite 102, user route tables 216 may track which satellite 102 users 114 are connected to. For example, if user 114-2 is connected to satellite 102-2 (e.g., via user-link 118-2), then user route table 216 for satellite 102-2 may indicate that user 114-2 is locally connected to satellite 102-2 (e.g., via local routing information such as currently active user-links 118-2 and/or an egress port of switch/router 214 associated with user-link 118-2). User route tables 216 for other satellites 102 may indicate that user 114-2 is not locally attached to that particular satellite 102. For instance, user route table 216 for satellite 102-1, which is not locally connected to user 114-2, may indicate an egress port associated with forwarding data to user 114-2 (e.g., an egress port associated with intra-orbit link 110-1 between satellite 102-1 and satellite 102-2). As users 114 are handed off to different satellites 102 in topology 100, ground controller 120 is tasked with calculating new user route tables 216 for each of satellites 102 that indicate the connectivity changes for users 114, and uploading the appropriate user route tables 216 to satellites 102.

As discussed previously, backbone route tables 218 may be different for each satellite 102 because each of satellites 102 may see a different portion of topology 100. For example, satellite 102-4 sees a portion of topology 100 that includes intra-orbit link 110-3 with satellite 102-5 and inter-orbit link 112-2 with satellite 102-1, while satellite 102-5 sees a portion of topology 100 that includes intra-orbit link 110-3 with satellite 102-4, intra-orbit link 110-4 with satellite 102-6, and inter-orbit link 112-2 with satellite 102-2. Ground controller 120 is tasked with pre-calculating and uploading backbone route tables 218 to satellites 102. Ground controller 120 may also be tasked with instructing satellites 102 which backbone route table 218 should be used at a particular point in time. For example, ground controller 120 may instruct satellites 102 to utilize backbone route table 218-1 during a first time-frame during the day, and subsequently instruct satellites 102 to utilize backbone route table 218-2 during a second time-frame during the day.

Figure 2B:
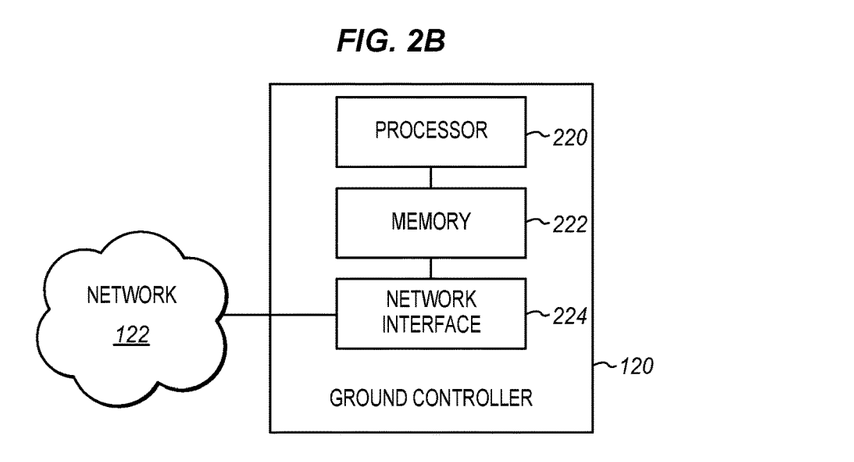
FIG. 2B is a block diagram of a ground controller of the NGSO satellite system of FIG. 1 in an illustrative embodiment.

In this embodiment, ground controller 120 manages and communicates with satellites 102 over a network 122 that is coupled to user 114-3, which is illustrated as a ground station in this embodiment. FIG. 2B is a block diagram of ground controller 120 in an illustrative embodiment. In this embodiment, ground controller 120 may include, without limitation, one or more processors 220 that execute software instructions, a memory 222, and a network interface 224. Network interface 224 electrically couples ground controller 120 with network 122. Network interface 224 includes any component, system, or device that provides network signaling and network frame processing capabilities to ground controller 120. Network 122 may comprise, in some embodiments, a local network, the Internet, or a combination of local networks and the Internet.

Figure 3:
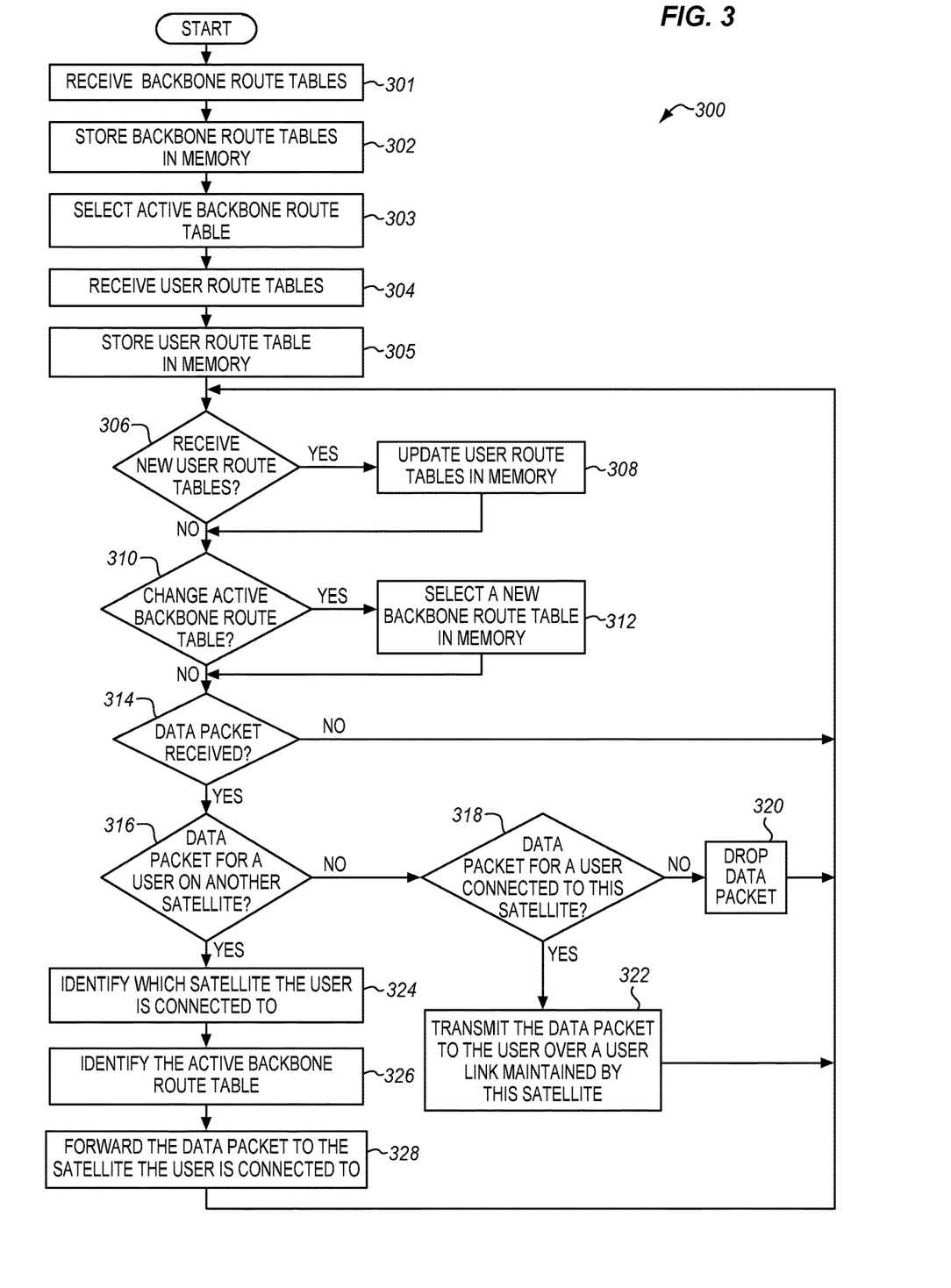
FIG. 3 is a flow chart of a method operable by a satellite of the NGSO satellite system of FIG. 1 in an illustrative embodiment.

FIG. 3 is a flow chart of a method 300 operable by a NGSO satellite in an illustrative embodiment. Method 300 will be discussed with respect to satellite 102-2 of topology 100 of FIG. 1, although method 300 applies equally to other satellites 102 in topology 100. In addition, method 300 applies equally to other NGSO satellites in other topologies. The steps of method 300 are not all inclusive, and method 300 may include other steps, not shown. Further, the steps of method 300 may be performed in an alternate order.

Consider that topology 100 is operational, and that ground controller 120 has pre-calculated backbone route tables 218 for satellite 102-2. To do so, ground controller 120 utilizes a-priori orbital information for satellite 102-2, including the time-varying field of view that satellite 102-2 has of other satellites 102 in topology 100. For instance, over time, the field of view of satellite 102-2 to other satellites 102 in topology 100 may include satellite 102-6, satellite 102-5, and satellite 102-4, with ground controller 120 pre-calculating backbone route tables 218 for satellite 102-2 that change over time accordingly.

In response to calculating backbone route tables 218 for satellite 102-2, ground controller 120 uploads backbone route tables 218 to satellite 102-2. Satellite 102-2 receives backbone route tables 218 from ground controller 120 (see step 301), and stores backbone route tables 218 in memory 204 (see step 302). Satellite 102-2 selects an active backbone route table 218 stored in memory 204 (e.g., as directed by ground controller 120, see step 303).

Ground controller 120 calculates user route tables 216 for satellite 102-2, which includes information regarding whether users 114 are locally connected to satellite 102-2 and which of users 114 are connected to other satellites 102 in topology 100. For example, user route tables 216 for satellite 102-2 may indicate that user 114-2 is locally connected to satellite 102-2, and that user 114-1 and user 114-3 are connected to other satellites 102 in topology 100. This type of information allows satellite 102-2 to determine whether data packet for users 114 is forwarded to another satellite 102 in topology 100 or is processed locally at satellite 102-2 without forwarding.

In response to calculating user route tables 216 for satellite 102-2, ground controller 120 uploads user route tables 216 to satellite 102-2, which is received by satellite 102-2 (see step 304). Satellite 102-2 stores its user route tables 216 in memory 204 (see step 305).

During operation, satellite 102-2 monitors information from ground controller 120 to determine if it has received new user route tables 216 (see step 306). If no new user route tables 216 are received, then step 310 is performed. New user route tables 216 may be received, for example, when a handoff occurs for users 114 from one satellite 102 to another satellite 102. When a handoff occurs, ground controller 120 calculates new user route tables 216 that reflect the changes in how users 114 are connected to satellites 102 in topology 100, and uploads the new user route tables to the appropriate satellites 102. When new user route tables 216 are received by satellite 102-2, satellite 102-2 updates user route tables 216 stored in memory 204 (see step 308), and step 310 is performed.

During operation, satellite 102-2 also determines if the active backbone route table 218 has changed (see step 310). If the active backbone route table 218 has not changed, then step 314 is performed. Generally, the active backbone route table 218 is changed based on the time-varying changes in topology 100. In one embodiment, ground controller 120 instructs satellite 102-2 when to change the active backbone route table 218. In another embodiment, satellite 102-2 selects a different backbone route table 218 based on an internal criteria, such as the time of day. If satellite 102-2 is instructed or decides to change the active backbone route table 218, satellite 102-2 selects a new backbone route table 218 from the plurality of backbone route tables 218 previously received by satellite 102-2 from ground controller 120 (see step 312), and step 314 is performed.

During operation, satellite 102-2 monitors its communication links (e.g., intra-obit links 110, inter-orbit links 112, and user-links 118 to determine if a data packet has been received for processing (see step 314). Receiving a data packet also comprises receiving a plurality of data packets in other embodiments. Thus, the following discussion regarding the processing of a received data packet apply equally to processing a plurality of data packets.

If no data packet is received, then satellite 102-2 continues to monitor and processing returns to step 306. If a data packet is received by satellite 102-2, then step 316 is performed. The received data packet may, for example, be for one of users 114. Satellite 102-2 determines, based on one or more of user route tables 216, whether the data packet is for users 114 that are locally connected to other satellites 102 in topology 100 (see step 316). For example, users 114 that are serviced by user-links 118 maintained by satellites 102 other than satellite 102-2. If the data packet is not for users 114 on other satellites 102, then satellite 102-2 determines if the data packet is for users 114 locally connected to itself (e.g., satellite 102-2), in step 318. If the data packet is not for any users 114 serviced by satellite 102-2, then the data packet is dropped (see step 320) and processing returns to step 306 for monitoring.

If satellite 102-2 determines that the data packet is for user 114 that is locally connected to itself, then satellite 102-2 transmits the packet to user 114 over a user-link 118 that is maintained by satellite 102-2 (see step 322), and processing returns to step 306. For example, if the data packet is addressed to user 114-2, then satellite 102-2 transmits the packet to user 114-2 over user-link 118-2.

When satellite 102-2 determines that the data packet is for users 114 locally connected to a different satellite 102 as described in step 316, then satellite 102-2 identifies, based on user route tables 216, which of satellites 102 user 114 is locally connected to (see step 324). Satellite 102-2 identifies an active backbone route table 218 at satellite 102-2 (see step 326), and forwards the data packet to one of satellites 102 that user 114 is locally connected to based on the active backbone route table 218 (see step 328). Processing then returns to step 306 for monitoring.

For example, consider that satellite 102-2 receives a data packet addressed to user 114-1. Based on user route tables 216 stored at satellite 102-2, satellite 102-2 determines that user 114-1 is locally connected to satellite 102-4. Satellite 102-2 then forwards the data packet to satellite 102-4 based on the active backbone route table 218 stored in memory 204 of satellite 102-2. The active backbone route table 218 may, for example, instruct satellite 102-2 to forward the data packet for user 114-1 to satellite 102-1 via intra-orbit link 110-1, or to forward the data packet for user 114-1 to satellite 102-5 via inter-orbit link 112-2. In either case, the receiving satellite 102 performs the same or similar process to determine if the received data packet is for users 114 that are locally connected to that particular satellite 102. For example, if satellite 102-1 receives the data packet for user 114-1 from satellite 102-2, the satellite 102-1 would determine that user 114-1 is locally connected to another satellite 102, and in response, satellite 102-1 forwards the data packet to satellite 102-4 via inter-orbit link 112-4. If satellite 102-5 receives the data packet from satellite 102-2, then satellite 102-5 would determine that user 114-1 is locally connected to another satellite 102, and in response, satellite 102-5 forwards the data packet to satellite 102-4 via intra-orbit link 110-3. In response to satellite 102-4 receiving the data packet for user 114-1, satellite 102-4 determines that user 114-1 is not locally connected to another satellite 102, and transmits the data packet to user 114-1 via a user-link 118 maintained by satellite 102-4 (e.g., user-link 118-1).

Figure 4:
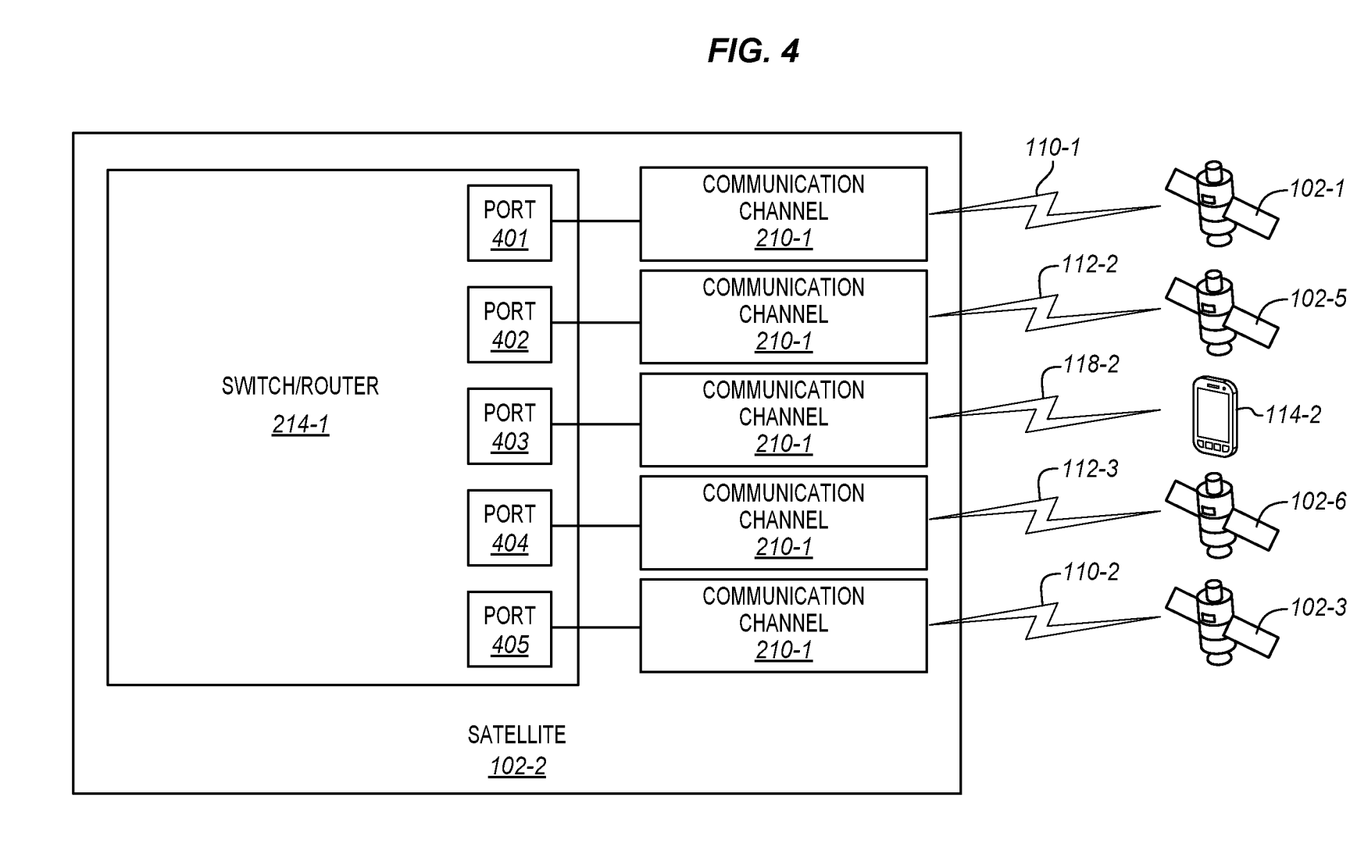
FIG. 4 is a routing implementation for a satellite of the NGSO satellite system of FIG. 1 in an illustrative embodiment.

FIG. 4 is a routing implementation for satellite 102-2 in an illustrative embodiment. In this embodiment, switch/router 214-1 for satellite 102-2 includes ports 401-405, which are communicatively coupled, respectively, to communication channel 210-1, communication channel 210-2, communication channel 210-3, communication channel 210-4, and communication channel 210-5. Based on topology 100 at a particular point in time, port 401 provides a routing path to satellite 102-1 over intra-orbit link 110-1, port 402 provides a routing path to satellite 102-5 over inter-orbit link 112-2, port 403 provides a routing path to user 114-2, port 404 provides a routing path to satellite 102-6, and port 405 provides a routing path to satellite 102-3 over intra-orbit link 110-2. FIG. 4 will be used in a subsequent discussion about how satellite 102-2 may perform a packet routing process using user route tables 216 and backbone route tables 218 as described in FIG. 3.

Figure 5:
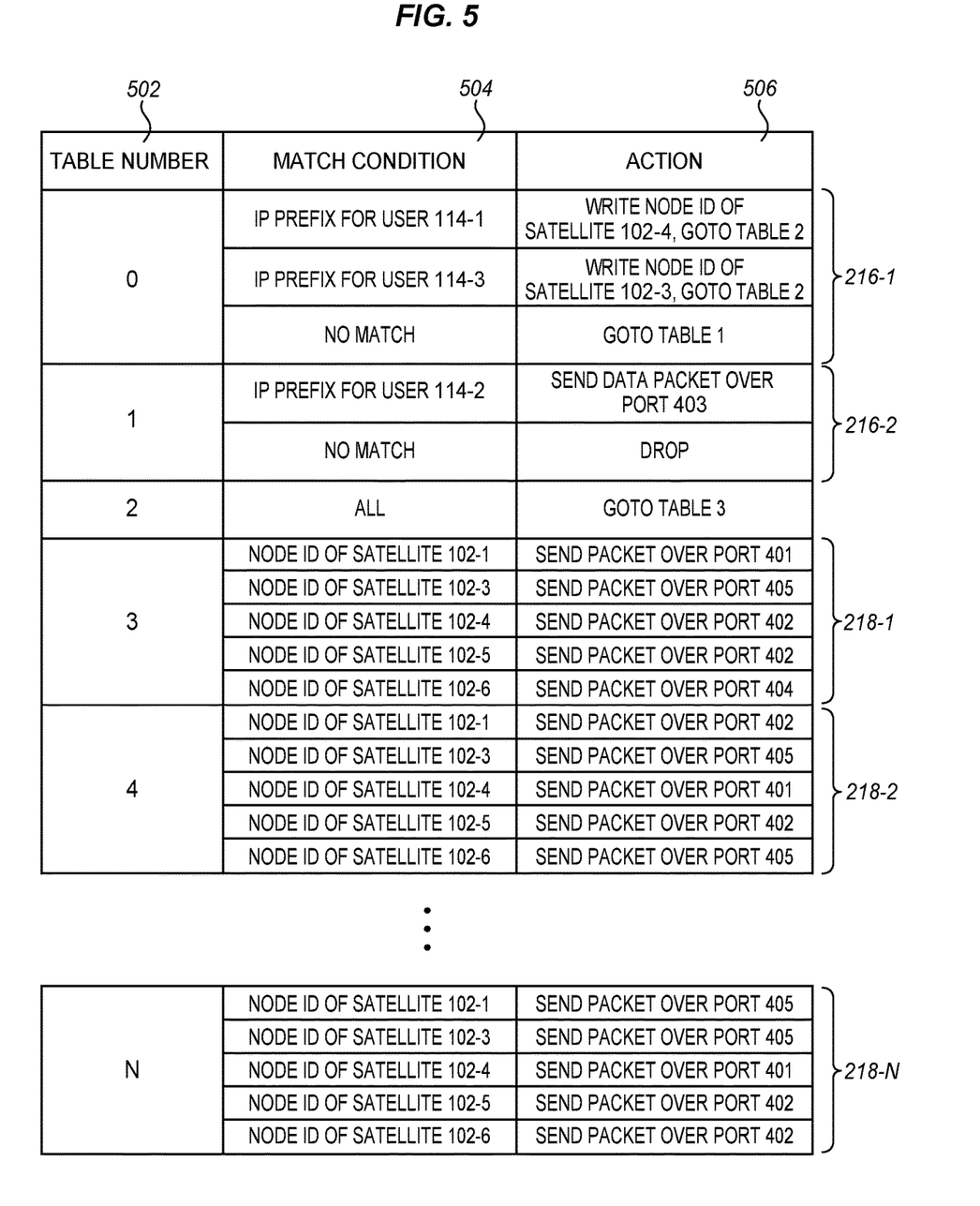
FIG. 5 depicts user route tables and backbone route tables for a satellite of the NGSO satellite system of FIG. 1 in an illustrative embodiment.

FIG. 5 depicts user route tables 216 and backbone route tables 218 for satellite 102-2 in an illustrative embodiment. In particular, FIG. 5 illustrates a plurality of table numbers 502 of 0-N, which are used by satellite 102-2 when processing data packets received for users 114, with N being an arbitrary table number. Further, each table number 502 in FIG. 5 defines a match condition 504 and an action 506 that is taken when a match occurs in its corresponding table. Table zero corresponds to a user route table 216-1, which defines what action 506 occurs which of users 114 are not locally connected to satellite 102-2. Table one corresponds to a user route table 216-2, which defines what action 506 occurs when users 114 are locally connected to satellite 102-2. Table two defines which backbone route table 218 is currently active. In FIG. 5, the active backbone route table 218 is table three, which corresponds to backbone route table 218-1. Each of backbone route tables 218 defines what action 506 occurs when routing data packets to satellites 102 other than satellite 102-2. FIG. 5 also illustrates tables four and N, which specify a future backbone routing topology for satellite 102-2. How satellite 102-2 utilizes the tables of FIG. 5 and the routing topology of FIG. 4 will be discussed below with respect to FIG. 6.

Figure 6:
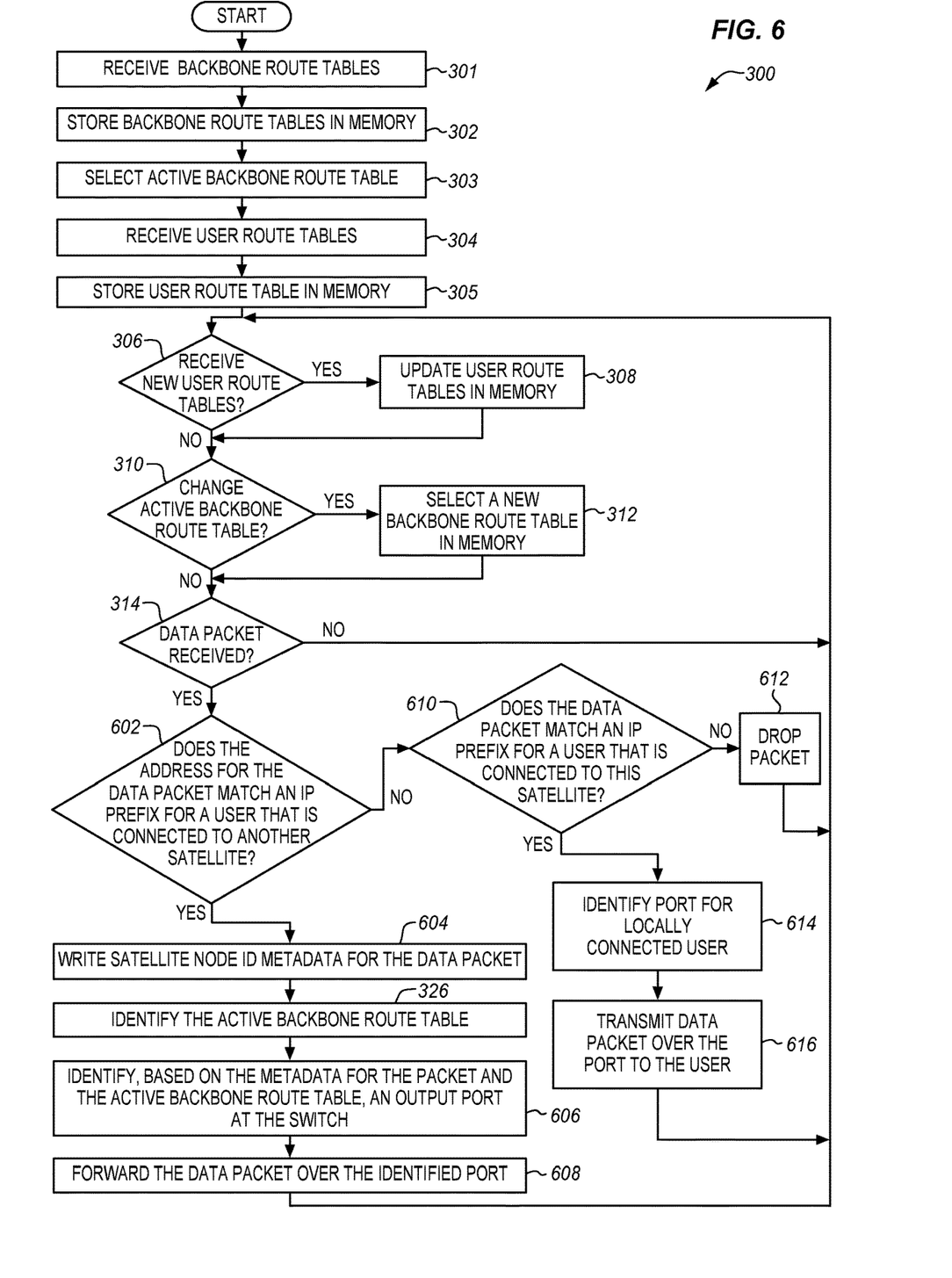
FIG. 6 depicts additional details of the method of FIG. 3 in an illustrative embodiment.

FIG. 6 depicts additional details of method 300 in an illustrative embodiment. The steps of FIG. 6 will be described with respect to FIG. 5-6 and satellite 102-2, although the steps in FIG. 6 may apply to other NGSO satellites in either topology 100 or other NGSO topologies.

When a data packet is received by satellite 102-2 (see step 314), processing of the data packet begins at table zero of FIG. 5, which corresponds to user route table 216-1. In this embodiment, user route table 216-1 (table zero) identifies which of users 114 in topology 100 are connected to other satellites 102 (e.g., users 114 not locally connected to satellite 102-2). For example, user route table 216-1 defines that user 114-1 is locally connected to satellite 102-4 and that user 114-3 is locally connected to satellite 102-3. When a data packet is received by satellite 102-2, satellite 102-2 determines, based on the entries in table zero and match conditions 504, if the address for the data packet matches an IP prefix for users 114 that are locally connected to other satellites 102 (see step 602 of FIG. 6). An IP prefix match in table zero informs satellite 102-2 that the data packet received by satellite 102-2 is destined for another satellite 102 in topology 100.

If a match occurs for an entry in table zero, then satellite 102-2 performs action 506 in table zero that corresponds to the match entry. In particular, satellite 102-2 writes satellite node ID metadata for the data packet, which tags how the data packet is subsequently processed (see step 604).

For example, if the data packet received by satellite 102-2 includes an IP prefix for user 114-1, satellite 102-2 performs action 506 to write a node ID of satellite 102-4 to metadata associated with the packet, and processing jumps to table two. If the data packet received by satellite 102-2 includes an IP prefix for user 114-3, satellite 102-2 performs action 506 to write the node ID of satellite 102-3 to metadata associated with the packet, and processing also jumps to table two. In either case, the metadata written for the data packet defines how backbone route tables 218 will forward the data packet through switch/router 214-1 (see FIG. 4) of satellite 102-2. Using table two in FIG. 5, satellite 102-2 identifies the active backbone route table 218 (see step 324). In FIG. 5, table two indicates that the active backbone route table 218 is located in table three, which corresponds to backbone route table 218-1. Using the information in table two, processing continues at table three in FIG. 5. Using table three and the metadata written for the data packet, satellite 102-2 identifies which of ports 401-405 of switch/router 214-1 the data packet is to be routed to (see step 606). Satellite 102-2 then routes the data packet to one of satellites 102 using the identified port at switch/router 214-1 (see step 608).

Returning to step 602, if no match condition 504 is found for the data packet, then satellite 102-2 begins processing table one, which corresponds to user route table 216-2. In this case, no match assumes that the data packet received by satellite 102-2 is for users 114 that are locally connected to satellite 102-2 (e.g., users 114 that communicate with satellite 102-2 via user-links 118).

As processing moves to table one based on action 506 specified in table zero, satellite 102-2 determines if the data packet received by satellite 102-2 matches an IP prefix for users 114 in table one (i.e., user route table 214-2). Table one identifies which users 114, if any, that are locally connected to satellite 102-2 (see step 610). If no match occurs, then the packet is dropped (see step 612). If the address of the data packet does match an IP prefix for users 114 in table one, then satellite 102-2 identifies a local port for its locally attached user 114 (see step 614). Satellite 102-2 then transmits the data packet to its user 114 over the identified port using switch/router 214-1 (see step 616). In this embodiment, user 114-2 is locally connected to satellite 102-2 at port 403 via user-link 118-2 (see FIG. 4). Therefore, if the data packet matches the IP prefix for user 114-2 in table one, then satellite 102-2 performs action 506 in table one to send the data packet over port 403 at switch/router 214-1.

For example, if the metadata associated with the data packet indicates a node ID of satellite 102-1, then satellite 102-2 forwards the data packet over port 401 as indicated in backbone route table 218-1. If the metadata indicates a node ID of satellite 102-3, then port 405 is used. In like manner, port 402 is used if the metadata indicates a node ID of satellite 102-4, and port 404 is used if the metadata indicates a node ID of satellite 102-6. This information corresponds to match conditions 504 and their action 506 as indicated in table three, which is backbone route table 218-1. How the various ports 401-405 correspond to intra-orbit links 110, inter-orbit links 112, or user-links 118 for satellite 102-2 is more clearly identified in FIG. 4, which is a snapshot of the routing topology defined by the active backbone route table 218-1 at satellite 102-2. In response to transmitting data in step 614, processing returns to step 306 for monitoring.

As discussed previously with respect to FIG. 3, satellite 102-2 may receive updates to its user route tables 216 during operation as users 114 are handed off to different satellites 102 in topology 100. When an update occurs, satellite 102-2 performs step 308 (see FIG. 6) by updating table zero and/or table one in FIG. 5, which corresponds to user route table 216-1 and user route table 216-2, respectively. For example, if user 114-1 is handed off from satellite 102-4 to 102-5, ground controller generates a new user route table 216-1 for satellite 102-2 that indicates that action 506 for user 114-1 changes to write the node ID of satellite 102-2 rather than a node ID of satellite 102-4. This type of update is performed independently of backbone route tables 218, thereby reducing the computational burden on ground controller 120 and the real-time data updates from ground controller 120 to satellites 102. In another example, if user 114-2 is handed off from satellite 102-2 to satellite 102-5 (e.g., user-link 118-2 is torn down between user 114-2 and satellite 102-2, and user-link 118-4 is created between user 114-2 and satellite 102-5), ground controller 120 updates both user route table 216-1 and user route table 216-2 for satellite 102-2. In particular, the update to table zero would indicate that user 114-2 is located at satellite 102-5, and the entry for user 114-2 in table two would be removed.

Also discussed previously, different backbone route tables 218 are used by satellites 102 at different points in time, as topology 100 changes due to the orbital motion of satellites 102. When a new backbone route table 218 is selected (see step 312 of FIG. 6), satellite 102-2 updates table two at various times to indicated which backbone route table 218 is currently active. For example, at some future point in time, table two in FIG. 5 may be updated to point to a new backbone route table 218 (e.g., backbone route table 218-2 in table four, by updating the information in table two). This allows satellite 102-2 to adapt to changes in topology 100 over time during a packet routing process.

Although this process has been specifically described with respect to the transient backbone topology defined in backbone routing table 218-1 and satellite 102-2, this process applies equally to other satellites 102 in topology 100, and at other operational times during which topology 100 will change based on the orbital mechanics of satellites 102.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. A method operable by a satellite of a Non-Geostationary Satellite Orbit (NGSO) system, the method comprising:
   receiving a plurality of backbone route tables from a ground controller, wherein each of the backbone route tables defines a snapshot of a time-varying backbone topology of the NGSO system;
   receiving one or more user route tables from the ground controller, wherein the user route tables identify connectivity of users to satellites in the NGSO system;
   receiving a data packet for routing in the NGSO system;
   determining, based on the user route tables, if the data packet is destined for a first user directly connected to another satellite in the NGSO system;
   responsive to determining that the data packet is destined for the first user, performing the steps of:
     identifying the other satellite based on the user route tables;
     identifying an active backbone route table from the plurality of backbone route tables;
     forwarding the data packet to the other satellite based on the active backbone route table; and
     determining, based on the user route tables, if the data packet is destined for a second user directly connected to the satellite; and
   responsive to determining that the data packet is destined for the second user, transmitting the data packet to the second user over a user-link maintained by the satellite.

2. The method of claim 1, further comprising:
   determining that the active backbone route table has changed, wherein the active backbone route table defines a first snapshot of the time-varying backbone topology of the NGSO system; and
   selecting a new active backbone route table from the plurality of backbone route tables, wherein the new active backbone route table defines a second snapshot of the time-varying backbone topology of the NGSO system that is different than the first snapshot.

3. The method of claim 2, wherein the step of determining that the active backbone route table has changed comprises:
   receiving instructions to select the new active backbone route table from the ground controller.

4. The method of claim 1, further comprising:
   receiving updates to the user route tables from the ground controller in response to real-time or predicted changes in the connectivity of the users to the satellites in the NGSO system.

5. The method of claim 1, wherein:
   determining, based on the user route tables, if the data packet is destined for the first user comprises:
     determining that the data packet is destined for the first user when an address for the data packet matches an Internet Protocol (IP) prefix for a table entry for the first user in a first user route table of the one or more user route tables; and
   the method further comprises:
     writing satellite node identification (ID) metadata for the data packet;
     identifying, based on the metadata for the data packet and the active backbone route table, a first port at a switch of the satellite that is communicatively coupled to another satellite via at least one of an intra-orbit link and an inter-orbit link; and
     forwarding the data packet over the first port.

6. The method of claim 5, wherein:
   determining, based on the user route tables, if the data packet is destined for the second user comprises:
     determining that the data packet is addressed to the second user when the address for the data packet matches an IP prefix for a table entry for the second user in a second user route table of the one or more user route tables, and
   the method further comprises:
     identifying, based on the table entry for the second user in the second user route table, a second port at the switch of the satellite that is communicatively coupled to the second user via a user-link; and
     transmitting the data packet to the second user over the second port.

7. The method of claim 6, further comprising:
   receiving, from the ground controller, updates to the first user route table based on real-time or predicted connectivity changes of the first user to the other satellites in the NGSO system.

8. The method of claim 7, further comprising:
   receiving, from the ground controller, updates to the second user route table based on real-time or predicted connectivity changes of the second user to the satellite.

9. A non-transitory computer readable medium embodying programmed instructions which, when executed by one or more processors of a satellite of a Non-Geostationary Satellite Orbit (NGSO) system, direct the satellite to:
   receive a plurality of backbone route tables from a ground controller, wherein each of the backbone route tables defines a snapshot of a time-varying backbone topology of the NGSO system;
   receive one or more user route tables from the ground controller, wherein the user route tables identify connectivity of users to satellites in the NGSO system;
   receive a data packet for routing in the NGSO system;
   determine, based on the user route tables, if the data packet is destined for a first user directly connected to another satellite in the NGSO system;
   responsive to a determination that the data packet is destined for the first user, to:
     identify the other satellite based on the user route tables;
     identify an active backbone route table from the plurality of backbone route tables;
     forward the data packet to the other satellite based on the active backbone route table; and
     determine, based on the user route tables, if the data packet is destined for a second user directly connected to the satellite; and
   responsive to a determination that the data packet is destined for the second user, to transmit the data packet to the second user over a user-link maintained by the satellite.

10. The non-transitory computer readable medium of claim 9, wherein the programmed instructions further direct the satellite to:
    determine that the active backbone route table has changed, wherein the active backbone route table defines a first snapshot of the time-varying backbone topology of the NGSO system; and select a new active backbone route table from the plurality of backbone route tables, wherein the new active backbone route table defines a second snapshot of the time-varying backbone topology of the NGSO system that is different than the first snapshot.

11. The non-transitory computer readable medium of claim 10, wherein the programmed instructions further direct the satellite to:

select the new active backbone route table in response to instructions received from the ground controller.

12. The non-transitory computer readable medium of claim 9, wherein the programmed instructions further direct the satellite to:

receive updates to the user route tables from the ground controller in response to real-time or predicted changes in connectivity of users to the satellites in the NGSO system.

13. The non-transitory computer readable medium of claim 9, wherein:

the satellite determines that the data packet is destined for the first user when an address for the data packet matches an Internet Protocol (IP) prefix for a table entry for the first user in a first user route table of the one or more user route tables; and the programmed instructions further direct the satellite to:
write satellite node identification (ID) metadata for the data packet;
identify, based on the metadata for the data packet and the active backbone route table, a first port at a switch of the satellite that is communicatively coupled to another satellite via at least one of an intra-orbit link and an inter-orbit link; and
forward the data packet over the first port.

14. The non-transitory computer readable medium of claim 13, wherein:

the satellite determines that the data packet is addressed to the second user when the address for the data packet matches an IP prefix for a table entry for the second user in a second user route table of the one or more user route tables, and the programmed instructions further direct the satellite to:
identify, based on the table entry for the second user in the second user route table, a second port at the switch of the satellite that is communicatively coupled to the second user via a user-link; and
transmit the data packet to the second user over the second port.

15. The non-transitory computer readable medium of claim 14, wherein the programmed instructions further direct the satellite to:

receive, from the ground controller, updates to the first user route table based on real-time or predicted connectivity changes of the first user to the other satellites in the NGSO system.

16. The non-transitory computer readable medium of claim 15, wherein the programmed instructions further direct the satellite to:

receive, from the ground controller, updates to the second user route table based on real-time or predicted connectivity changes of the second user to the satellite.

17. A Non-Geostationary Satellite Orbit (NGSO) system, the NGSO system comprising:
a satellite, comprising:
a memory storing:

a plurality of backbone route tables received from a ground controller, wherein each of the backbone route tables defines a snapshot of a time-varying backbone topology of the NGSO system; and one or more user route tables received from the ground controller, wherein the user route tables identify connectivity of users to satellites in the NGSO system;

a communication system configured to implement at least one of user-links with users of the NGSO system, intra-orbit links with other satellites in the NGSO system that share a common orbital plane with the satellite, and inter-orbit links with the other satellites in the NGSO system that are in different orbital planes to the satellite; and at least one processor configured to receive a data packet for routing in the NGSO system, and to determine, based on the user route tables, if the data packet is destined for a first user directly connected to another satellite in the NGSO system, wherein the at least one processor is configured, responsive to determining that the data packet is destined for the first user, to identify the other satellite based on the user route tables, to identify an active backbone route table from the plurality of backbone route tables, to forward the data packet to the other satellite over an inter-orbit link or an intra-orbit link based on the active backbone route table, wherein the at least one processor is configured to determine, based on the user route tables, if the data packet is destined for a second user directly connected to the satellite, and responsive to determining that the data packet is destined for the second user, to transmit the data packet to the second user over a user-link maintained by the satellite.

18. The NGSO system of claim 17, wherein:
the at least one processor is configured to determine that the active backbone route table has changed, wherein the active backbone route table defines a first snapshot of the time-varying backbone topology of the NGSO system, and the at least one processor is configured to select a new active backbone route table from the plurality of backbone route tables, wherein the new active backbone route table defines a second snapshot of the time-varying backbone topology of the NGSO system that is different than the first snapshot.

19. The NGSO system of claim 18, wherein:
the at least one processor is configured to select the new active backbone route table in response to instructions received from the ground controller.

20. The NGSO system of claim 17, wherein:
the at least one processor is configured to receive updates to the user route tables from the ground controller in response to real-time or predicted changes in connectivity of users to the satellites in the NGSO system.

21. The NGSO system of claim 17, wherein:
the satellite further includes:
a switch having a first port that is communicatively coupled to the other satellite via the intra-orbit link or the inter-orbit link, the at least one processor is configured to determine that the data packet is destined for the first user when an address for the data packet matches an Internet Protocol (IP) prefix for a table entry for the first user in a first user route table of the one or more user route tables, the at least one processor is configured to write satellite node identification (ID) metadata for the data packet, to identify, based on the metadata for the data packet and the active backbone route table, the first port, and to forward the data packet over the first port to the other satellite.

22. The NGSO system of claim 21, wherein:

the switch further includes a second port that is communicatively coupled to the second user via a user link, the at least one processor is configured to determine that the data packet is addressed to the second user when the address for the data packet matches an IP prefix for a table entry for the second user in a second user route table of the one or more user route tables, to identify, based on the table entry for the second user in the second user route table, the second port, and to transmit the data packet to the second user over the second port.

23. The NGSO system of claim 22, wherein:

the at least one processor is configured to receive, from the ground controller, updates to the first user route table based on real-time or predicted connectivity changes of the first user to the other satellites in the NGSO system.

24. The NGSO system of claim 23, wherein:

the at least one processor is configured to receive, from the ground controller, updates to the second user route table based on real-time or predicted connectivity changes of the second user to the satellite.

25. The NGSO system of claim 17, further comprising:

the ground controller.

\* \* \* \* \*